United States Patent [19]

Nelson et al.

[11] 4,134,700

[45] Jan. 16, 1979

[54] ZERO CLEARANCE SPLINE COUPLING

[75] Inventors: Robert W. Nelson; Steven M. Pierce, both of Waterloo, Iowa

[73] Assignee: Deere & Company, Moline, Ill.

[21] Appl. No.: 876,615

[22] Filed: Feb. 10, 1978

[51] Int. Cl.² ............................................. F16B 7/02
[52] U.S. Cl. ...................................... 403/334; 74/531;
403/371; 403/359
[58] Field of Search ............... 403/359, 361, 370, 371, 403/365, 366, 334; 74/409, 531

[56] References Cited

U.S. PATENT DOCUMENTS

| | | | |
|---|---|---|---|
| 2,043,272 | 6/1936 | Wallgren | 403/370 X |
| 3,541,871 | 11/1970 | Burrell | 403/359 X |
| 3,608,685 | 9/1971 | Childress | 403/359 X |
| 3,738,691 | 6/1973 | Firth | 403/371 X |
| 3,742,656 | 7/1973 | Amos | 403/359 X |

*Primary Examiner*—Wayne L. Shedd

[57] ABSTRACT

The zero backlash spline coupling for a pair of shafts includes a first shaft having an integral flange and an internal frusto conical surface mateable with the frusto conical surface of a radially cut collar. The collar has internal spline teeth with one tooth on either side of the radial cut eliminated. The collar encircles a second shaft which has externally cut splines and abuts an internally spline-toothed keeper which also encircles the second shaft. Bolts passing through the keeper and into the flange draw the two together and force the collar to friction seat in the first shaft and lock onto the splines of the second shaft while providing a positive torque retention load on the bolts.

10 Claims, 5 Drawing Figures

ZERO CLEARANCE SPLINE COUPLING

BACKGROUND OF THE INVENTION

The present invention relates generally to couplings for shafts and more particularly to a coupling utilizing a first shaft having an internal frusto-conical surface and a second shaft having an externally splined end.

In the past, gears were mounted on shafts by means of two frusto conical surfaced parts which were drawn together to accomplish radial expansion of the outer part for frictional holding in the gear and radial contraction of the inner part for frictional holding on the shaft. To aid disassembly of the parts, the frusto-conical surfaces were coated with a low coefficient of friction material such as Teflon (TM) and a locking bar was inserted to prevent relative movement of the frusto-conical surfaces. While the above design was sufficient for most torque applications, where a zero backlash fit is required between two shafts because of high frequency torque variations around 300 hertz, accompanied by severe torque reversals, the design is insufficient and slip will occur which will culminate in the destruction of the shafts or the mechanisms connected thereto.

SUMMARY OF THE INVENTION

The present invention provides a zero backlash spline coupling for high torque loaded shafts which undergo high frequency torque variations and reversals.

The present invention further provides a zero backlash coupling which drives through frusto conical surfaces which can be easily separated when disassembling the coupling.

The present invention further provides a zero backlash spline coupling having a backup device to provide additional torque carrying capability.

The above and additional advantages of the present invention will become apparent to those skilled in the art from a reading of the following detailed description when taken in conjunction with the accompanying drawings.

DESCRIPTION OF THE PREFERRED EMBODIMENTS

Figures 1, 2, 3, 4, 5:
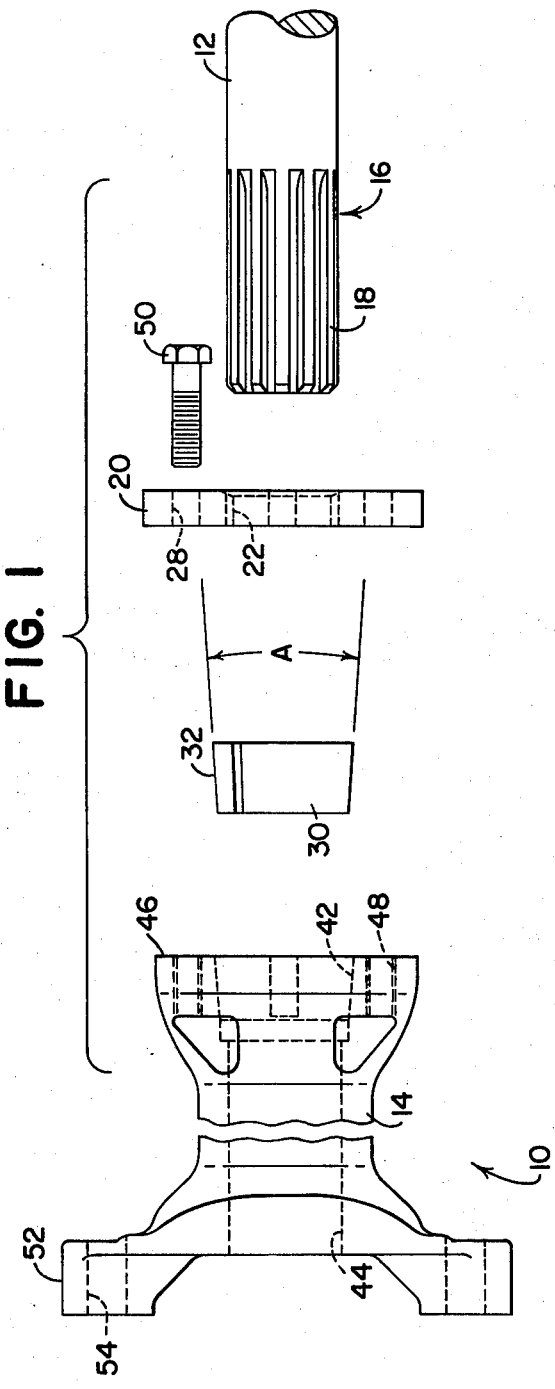
FIG. 1 shows a side view of an assembly incorporating the present invention.
FIG. 2 is a front view of a portion of the present invention.
FIG. 3 is a front view of another portion of present invention.
FIG. 4 is a front view of a portion of the present invention in an alternate embodiment.
FIG. 5 is a front view of another portion of the present invention in the alternate embodiment.

Referring now to the drawings, in FIG. 1 there is shown a zero backlash coupling assembly 10 for coupling first and second shafts 14 and 12.

The second shaft 12 has machined therein a conventional external involute spline 16 having a plurality of spline teeth 18.

Encircling the second shaft 12 is a keeper 20. The keeper 20 has a through hole 22 encircled by a plurality of involute spline teeth 24 which engage with the spline teeth 18 on the second shaft 12. The through hole 22 lacks a pair of adjacent spline teeth which would fit into a space 26 best seen in FIG. 3. The keeper 20 further has four clearance holes 28 provided therein. The second shaft 12 also is encircled by a collar 30 having an external frusto-conical surface 32 and a radial cut 34 through one wall. The collar 30 is provided with internal involute spline teeth 36 and lacks one spline tooth to either side of the radial cut in spaces 38 and 40 as best seen in FIG. 2.

The first shaft 14 is provided at one end with a frusto-conical surface 42 which is parallel to and mateable with the frusto-conical surface 32 of the collar 30. The frusto-conical surface 42 is connected to a through hole 44 which extends the length of the shaft 14. At one end of the shaft 14, proximate the frusto-conical surface 42 is a flange 46 having four threaded bolt holes 48 which are in the same pattern as the clearance holes 28 in the keeper 20.

Four bolts 50 pass through the clearance holes 28 in the keeper 20 and thread into the bolt holes 48 to urge the collar into engagement with the first shaft 14.

At a second end of the shaft 14 is a second flange 52 having clearance holes 54 by which the second shaft 14 is secured to a cushioned coupling (not shown) which connects to the driving mechanism such as the tractor engine (not shown).

It should be noted that the spaces 38 and 40 on the unclamped collar 30 will be the same size as the space 26 on the keeper 20 so as to allow the same broaching tool to be used to manufacture both parts and thus reduce manufacturing costs.

In an alternate embodiment as shown in FIG. 5, a keeper 20a having clearance holes 28a is provided with uniformly sized spline teeth 24a and a pair of smaller spline teeth 25a and 27a. In FIG. 4 is shown a collar 30a having a radial cut 34a with a pair of adjacent teeth 38a and 40a which are smaller than the remaining spline teeth 36a. The keeper 20a and the collar 30a are directly interchangeable with the keeper 20 and the collar 30, respectively, in FIG. 1.

It has been determined experimentally that included angles of less than 14° 15' 0" as shown at A in FIG. 1 are unsatisfactory because the desired torque level on the bolts 50 can not be obtained because the collar 30 continues to wedge into the taper 42 in the first shaft 14 as the bolts 50 are tightened. In addition, the collar 30 will not be self-releasing from the shaft 14 when the bolts 50 are removed. Further, it has been experimentally determined that included angles in excess of 19° 30' 0" are unsatisfactory because the desired load torque levels cannot be transmitted through the friction surfaces 32 and 42. In the preferred embodiment, the ideal included angle A has been determined to be 18° 55' 31". As mentioned, the keeper 20 has spline teeth 24 on its inner diameter. This affords the ability to provide a backup torque transmitting ability. Should a torque level higher than what the friction surfaces 32 and 42 are capable of transmitting be encountered, the assembly can slip only as far as the clearance of the bolts 50 in the holes 28 in the keeper 20 plus the clearances between the spline teeth on the keeper 24 and those on the second shaft 12 will allow. In applications where the reverse torque spikes never exceed the level of the friction surface capability, but an occasional forward torque spike may exceed it, this assembly provides a spline that will slip just one time due to overload and thereafter will remain a zero clearance coupling.

While it is obvious that the radial cut permits the collar 30 to be clamped down on the spline 16 by the wedging action into the shaft 14, not so obvious, but equally important, is the lack of the two spline teeth in spaces 38 and 40 which permit the spline teeth 36 of the collar 30 to circumferentially come into solid contact with the spline teeth 18 of the second shaft 12 so as to create the zero backlash holding condition.

Experience has shown that because the two spline teeth are missing, uneven loads are imposed on the spline broach used in manufacturing the keeper 20 and the collar 32 causing manufacturing problems. To eliminate this problem, an alternate embodiment has been developed as shown in FIG. 4 and 5 which provide the necessary clearance to assure solid contact on all the other teeth without imposing the uneven loading on the spline broach.

By reference to FIGS. 4 and 5, it may be seen that in the collar 30a, the spline teeth 38a and 40a on either side of the radial cut 34a are smaller than the other spline teeth 30a. Similarly, since the same spline broach is used on a keeper 20a, the spline teeth 25a and 27a are smaller than the other spline teeth 24a.

In the alternate embodiment, it has been determined that the spline teeth 25a, 27a, 38a, and 40a should be 30% thinner in tooth thickness than the other spline teeth 24a and 36a.

The design of the preferred embodiment is capable of operating at torque variations occurring at more than 300 hertz and with input torques in excess of 800 newton-meters with zero backlash.

The above and additional advantages of the present invention will become apparent to those skilled in the art from a reading of the following detailed description when taken in conjunction with the accompanying drawings.

We claim:

1. A zero backlash coupling comprising: a first shaft having a frusto-conical opening therein; a second shaft having external spline teeth thereon; a collar having a frusto-conical surface thereon engageable with the frusto-conical opening in the first shaft and positionable to encircle the spline teeth on the second shaft, said collar having a radial cut provided therein and internal spline teeth to engage the spline teeth on the second shaft; a keeper having a through hole provided therein positionable to encircle the spline teeth on the second shaft and abut the collar; and means for urging the collar and keeper towards the first shaft to cause engagement of the frusto-conical surface of the collar with the frusto-conical opening in the first shaft whereby the frusto-conical surface will be held by friction and the collar will clamp around the splined shaft.

2. The zero backlash coupling as claimed in claim 1 wherein the collar lacks a spline tooth on either side of the radial cut.

3. The zero backlash coupling as claimed in claim 1 wherein the keeper has internal spline teeth proximate the circumference of the through hole to engage the splines on the second shaft.

4. The zero backlash coupling as claimed in claim 3 wherein the keeper lacks two adjacent spline teeth.

5. The zero backlash coupling as claimed in claim 1 wherein the frusto-conical opening and surface are parallel and are tapered with an included angle of not less than 14° 15′ 0″ or more than 19° 30′ 0″.

6. The zero backlash coupling as claimed in claim 1 wherein the frusto-conical surface and opening are parallel and are tapered with an included angle of 18° 55′ 31″.

7. The zero backlash coupling as claimed in claim 1 wherein the spline teeth in the collar has a spline tooth on either side of the radial cut of a smaller tooth thickness than the other spline teeth.

8. The zero backlash coupling as claimed in claim 7 wherein the spline tooth on either side of the radial cut has a 30% smaller tooth thickness than the other spline teeth.

9. The zero backlash coupling as claimed in claim 1 wherein the spline teeth in the keeper includes a pair of adjacent spline teeth having a smaller tooth thickness than the other spline teeth.

10. The zero backlash coupling as claimed in claim 9 wherein the pair of adjacent spline teeth have a 30% smaller tooth thickness than the other spline teeth.

* * * * *